US008462481B2

(12) United States Patent
Lambert et al.

(10) Patent No.: US 8,462,481 B2
(45) Date of Patent: Jun. 11, 2013

(54) LIGHTNING PROTECTION SYSTEM AND AIRCRAFT COMPRISING SUCH A SYSTEM

(75) Inventors: Charles Lambert, Toulouse (FR); Christophe Bernus, Toulouse (FR); Jacques Fournie, Grenade (FR); Jean-Claude Marty, Grepiac (FR)

(73) Assignee: Airbus Operations (SAS), Toulouse (FR)

( * ) Notice: Subject to any disclaimer, the term of this patent is extended or adjusted under 35 U.S.C. 154(b) by 178 days.

(21) Appl. No.: 12/747,448

(22) PCT Filed: Dec. 10, 2008

(86) PCT No.: PCT/FR2008/052268
§ 371 (c)(1),
(2), (4) Date: Jul. 20, 2010

(87) PCT Pub. No.: WO2009/080990
PCT Pub. Date: Jul. 2, 2009

(65) Prior Publication Data
US 2010/0276536 A1    Nov. 4, 2010

(30) Foreign Application Priority Data
Dec. 11, 2007   (FR) ..................................... 07 59733

(51) Int. Cl.
*H02H 1/04*          (2006.01)
(52) U.S. Cl.
USPC .......................................... 361/218; 361/117
(58) Field of Classification Search
USPC ................................................ 361/218, 117
See application file for complete search history.

(56) References Cited

U.S. PATENT DOCUMENTS

| 4,380,039 A * | 4/1983 | King ............................ 361/218 |
| 4,502,092 A | 2/1985 | Bannink, Jr. et al. |
| 5,841,066 A | 11/1998 | Bocherens |
| 7,554,785 B2 * | 6/2009 | Hawley ....................... 361/218 |
| 7,835,130 B2 * | 11/2010 | Ware et al. ................... 361/218 |

FOREIGN PATENT DOCUMENTS

| EP | 0685389 A | 12/1995 |
| EP | 6790182 A | 8/1997 |
| EP | 1484245 A | 12/2004 |
| WO | 2006069996 A | 7/2006 |

OTHER PUBLICATIONS

International Search Report dated May 6, 2009.

* cited by examiner

*Primary Examiner* — Danny Nguyen
(74) *Attorney, Agent, or Firm* — Greer, Burns & Crain Ltd.

(57) ABSTRACT

An anti-lightning system for a composite structure having an external surface configured to be subjected to an air flow, the aforementioned system including at least one electrically conducting strip and fasteners attaching this strip to the aforementioned structure. According to the disclosed embodiments, with this structure including holes configured to accept the fastenings for the strip, at least some these fastenings comprise an attachment element that attaches the lightning to this structure. This attachment element is configured to be inserted in the hole with its upper part substantially flush with the external surface of the structure, this attachment element being in electrical contact with the electrically conducting strip. The electrically conducting strip is configured to be positioned on the opposite side of the structure to the external surface and electrically earthed.

14 Claims, 3 Drawing Sheets

LIGHTNING PROTECTION SYSTEM AND AIRCRAFT COMPRISING SUCH A SYSTEM

CROSS-REFERENCE TO RELATED APPLICATIONS

This application is the National Stage of International Application No. PCT/FR2008/052268 International Filing Date, 10 Dec., 2008, which designated the United States of America, and which International Application was published under PCT Article 21 (s) as WO Publication No. WO2009/080990 A1 and which claims priority from, and the benefit of, French Application No. 200759733 filed on 11 Dec. 2007, the disclosures of which are incorporated herein by reference in their entireties.

The aspects of the disclosed embodiments concern a lightning protection system for composite structures, in particular panels comprising a light central core such as a honeycomb or foam core. It is especially suited to protection against lightning strikes on an aircraft's radome or fuselage.

BACKGROUND

Sandwich structures made of composite material present exceptional properties, especially mechanical. They combine high resistance to mechanical and/or thermal constraints and high rigidity for a minimum mass.

These structures are therefore utilized widely in the space industry (satellites, probes, launchers) and aeronautical industry (radome, hatches, leading edges, ailerons, etc).

However, it is known that these structures are vulnerable to lightning strikes if they are not properly grounded. The high-density electric currents that then cross these composite structures can seriously damage them and lead, for example, to delamination. The case of the radome is even more critical since, by definition, it cannot integrate the standard lightning current discharge devices, such as a metal grid inserted in the structure's surface that, because of the requirements for transparency with regard to radar waves, are not allowed.

Means are known allowing the lightning's energy to be dissipated so as to protect these structures in the event of a lightning strike.

FIG. 1 shows such a means of dissipating the lightning energy according to the prior state of the art. Lightning conductor strips 1, typically made of aluminum or copper, are installed on the external surface 2 of an airplane's radome 3. These strips 1 are fastened on the radome by screw-type fastener units 4. Each lightning conductor strip 1 is electrically linked to the external surface 2 of the radome 3 to allow the electrostatic charges that build up there to be discharged. The member 5 in which the screw 4 is fitted to fasten the strip 1 is made of insulating plastic.

Each strip 1 is also connected to the junction of the airplane's fuselage to ensure that it is grounded individually. Thus a lightning arc hitting this strip 1 has its energy evacuated towards the ground without affecting any other element of the radome.

Although this energy dissipation means gives good results, perturbations 6 in the flow of the air 7 incident on the radome 3 have been observed, which are caused by the protrusions formed by the lightning conductor strips 1 at the external surface 2 of the radome (FIG. 1b).

However, when it constitutes an airplane's "nose" the radome has a generally conical shape to ensure good penetration in the air, and as a result makes a significant contribution to the aerodynamics of this airplane.

These aerodynamic perturbations 6 generate a drag, increased in particular by the triggering of the transition from laminar to turbulent flow, and consequently a very noticeable rise in the airplane's consumption of fuel, which is incompatible with the economic requirements of the airlines.

Further, when there is a severe lightning strike on a lightning conductor strip, damage to it can be observed with, for instance, a superficial fusion of this strip's fastening screw. Maintenance of the radome thus requires the latter's removal so that the damaged strip can be removed and replaced.

It would therefore be beneficial to have a system protecting an airplane's radome against lightning allowing drag to be reduced so as to produce a significant saving in fuel weight while having the greatest transparency possible with regard to radar waves.

SUMMARY

The objective of the disclosed embodiments is therefore to propose a lightning protection system for a composite structure, the external surface of which is subjected to an airflow, that is simple in its design and in its method of operation, making it possible to ensure a total dissipation of the energy of a lightning impact without damaging the structure and without perturbation in the airflow near this member.

For this, the disclosed embodiments concern a lightning protection system for a composite structure having an external surface intended to be subjected to an airflow, said system comprising at least one electrically conductive strip and fasteners to fasten this strip to this structure.

According to the disclosed embodiments,
  this structure bearing holes intended to receive fasteners to fasten the strip, at least some of these fasteners comprise an element attaching lightning flashes to the structure,
  this attachment element is intended to be inserted in this hole with its upper part substantially at the level of the external surface of the structure, this attachment element being in electrical contact with the electrically conductive strip, and
  the electrically conductive strip is intended to be placed on the opposite side of the structure to this external surface and to be connected to the ground.

"The electrically conductive strip is intended to be placed on the opposite side of the structure to this external surface" means that this electrically conductive strip is placed on the side of the structure's surface opposite to said external surface, i.e. on the side of the structure's internal surface, being either directly in contact with this internal surface, or placed at a distance from this.

"Upper part substantially at the level of the external surface of the structure" means that this upper part is at the same level as the structure's external surface, i.e. that the upper end of the attachment element is at the level of, or contiguous with, the external surface of the structure to close assembly tolerances.

This system can advantageously be implemented on any type of composite structure, whether monolithic, single sandwich or multiple sandwich.

In different particular embodiments of this lightning protection system, each having its specific advantages and capable of numerous possible technical combinations:
  the element attaching lightning flashes to the structure is a one-piece conducting stud comprising a threaded rod portion in its lower part, this portion being intended to pass through a piercing in the strip,
  Clearly, this piercing can be a tapped hole such that the threaded rod portion of the stud does not protrude from the electrically conductive strip and at the same time carries out its function of fastening said strip. An electrically insulating sheath that may be placed around the strip may therefore mold its lower part perfectly.

the electrically conductive strip having a depth e and a width I, the cross-section of the threaded rod is at least equal to I×e, Preferably, the cross-section of the threaded rod is equal to the cross-section of the electrically conductive strip. The diameter of the threaded rod is at least 6.35 mm in order to conduct the lightning current effectively.

the system comprises an insulating insert comprising a main body and possibly a head, the main body comprising a hollow able to receive the lightning attachment element, This insulating insert makes it possible to ensure the mechanical link between the composite structure, the element attaching lightning flashes to this structure and the electrically conductive strip.

the system comprises an electrically insulating sheath intended to cover the electrically conductive strip, The system thus preferably comprises a non-conductive paste intended to form a matrix enveloping at least the electrically conductive strip and its insulating sheath.

the system comprises electrically conductive pellets intended to be placed in recesses on the external surface of the structure, these recesses being substantially aligned and regularly spaced or not between two consecutive fasteners to facilitate the sweeping of the lightning arc between the elements attaching lightning flashes to the structure, the system comprises a metal grid intended to be integrated in the depth of the wall delimiting the external surface of said structure, this grid thus being intended to be in electrical contact with the lightning attachment elements.

The disclosed embodiments also concern a composite structure having an external surface intended to be subjected to an airflow. According to the disclosed embodiments, this composite structure is equipped with a lightning protection system as described above and the external surface of this composite structure with which the upper part of said attachment element is placed substantially at the same level is non-metallic.

As a consequence, this composite structure comprises at least one electrically conductive strip and fasteners to fasten this strip to the structure, which are received in holes in the composite structure provided for this purpose. At least some of these fasteners comprise an element attaching lightning flashes to the structure, this attachment element being inserted in a corresponding hole with its upper part substantially at the level of the external surface of the structure. In addition this attachment element is in electrical contact with the electrically conductive strip, which is placed on the opposite side of the structure to this external surface and connected to the ground.

"Upper part substantially at the level of the external surface of the structure" means that this upper part is at the same level as the structure's external surface, i.e. that the upper end of the attachment element is at the level of, or contiguous with, the external surface of the structure to close assembly tolerances.

In different particular embodiments of this composite structure, each having its specific advantages and capable of numerous possible technical combinations:

the attachment elements of this electrically conductive strip are arranged in the form of a strip, the attachment elements are substantially aligned and regularly spaced or not, This alignment of the attachment elements advantageously makes it possible to limit the surface area of elements likely to form a radio barrier with regard to radar waves for a radome equipped with such a lightning protection system.

this structure is monolithic or comprises at least two walls arranged respectively on opposite external surfaces of a core.

the composite structure comprises electrically conductive pellets placed in recesses on the external surface of this structure, these recesses being substantially aligned and regularly spaced or not between two consecutive fasteners to facilitate the sweeping of the lightning arc between the elements attaching lightning flashes to the structure, the structure is made of insulating material and comprises only said lightning attachment elements, said electrically conductive strip and possibly said pellets as conducting elements, Thus when the composite structure is hit by lightning, the current travels on the surface, without passing through this structure, until it meets the closest attachment elements and the associated electrically conductive strip. In addition, the presence of elements likely to form a radio barrier with regard to radar waves is limited as far as possible.

for each lightning attachment element, the composite structure comprises an insulating insert comprising a main body and possibly a head, the main body comprising a hollow receiving the lightning attachment element, This insulating insert makes it possible to ensure the mechanical link between the composite structure, the element attaching lightning flashes to this structure and the electrically conductive strip.

the composite structure comprises an electrically insulating sheath intended to cover the electrically conductive strip, The disclosed embodiments also concern a panel comprising at least one monolithic composite structure as described above.

"Monolithic" means a sheet or plate made of a single layer or composed of several layers associated or secured directly to each other, without interposition of a light core such as in an alveolar material, as in the case of the sandwich structure.

In a particular embodiment, this monolithic composite panel comprises a first skin forming the external wall of the panel and a second skin forming the internal wall of the panel. The skins constituting the panel are, for example, made of composite materials.

The disclosed embodiments also concern a panel comprising at least two walls arranged respectively on opposite external surfaces of a core, this panel being equipped with a lightning protection system as described above.

The core can be made of an alveolar material such as a honeycomb or foam material.

The disclosed embodiments concern a radome equipped with at least one panel as described above.

The disclosed embodiments concern an aircraft equipped with at least one panel as described above.

More generally, the disclosed embodiments concern a method of fitting a lightning protection system on a composite structure having an external surface intended to be subjected to an airflow, said system comprising at least one electrically conductive strip and fasteners to fasten this strip to said structure.

According to the disclosed embodiments, said electrically conductive strip is fitted on the opposite side of the structure to this external surface.

Preferably, at least some of said fasteners comprising an element attaching lightning flashes to the structure and said structure comprising holes intended to receive these fasteners, said attachment elements are placed in said holes such that the upper part of each attachment element is placed substantially at the level of the external surface of the structure, these attachment elements being in electrical contact with the electrically conductive strip and this external surface being non-metallic.

BRIEF DESCRIPTION OF THE DRAWINGS

The disclosed embodiments will be described in more detail with reference to the drawings included in an appendix, in which.

DETAILED DESCRIPTION

Figure 1A:
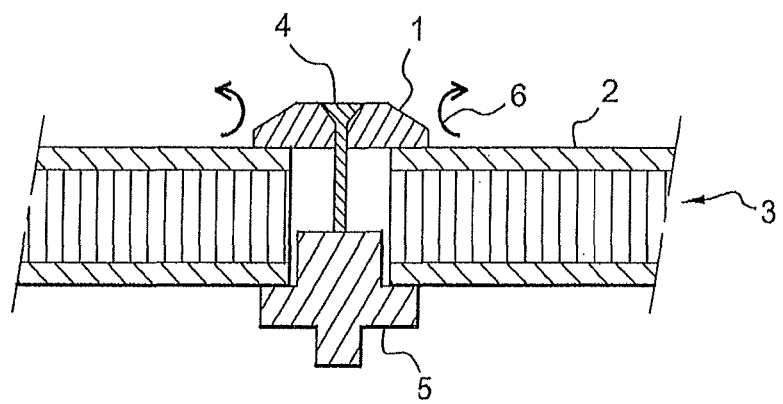
FIG. 1 shows an example of a means of dissipating the lightning energy according to the prior state of the art fitted on a panel of a radome, FIG. 1a) showing a cross-section view of this panel and FIG. 1b), a partial perspective view of this panel schematizing the airflows at its surface.
Figure 1B:
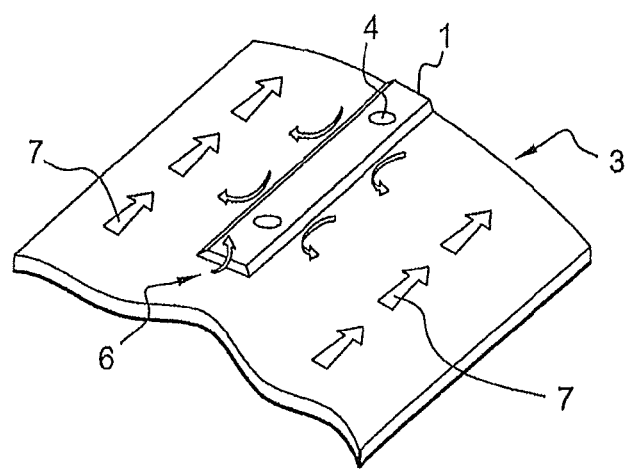
Figure 2:
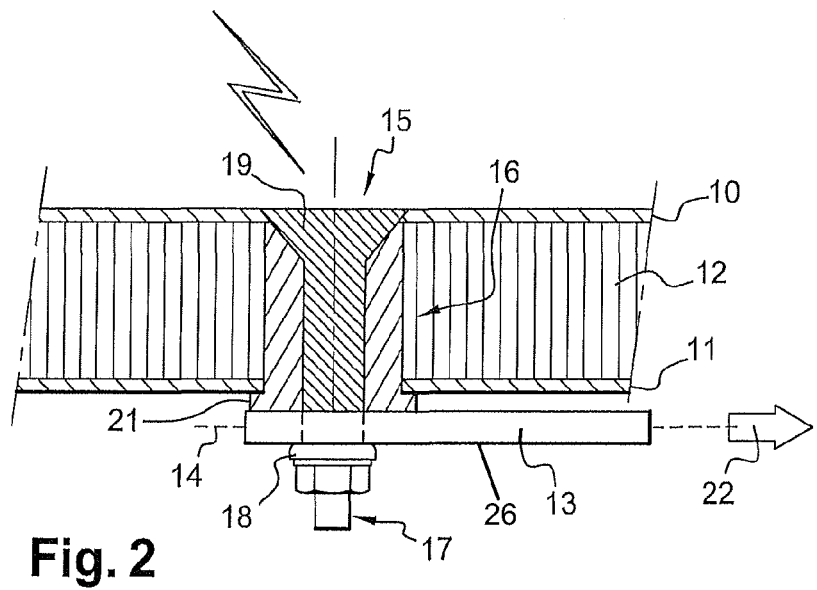
FIG. 2 is a schematic representation in cross-section of a panel equipped with a lightning protection system according to a first embodiment of the disclosed embodiments.
Figure 3:
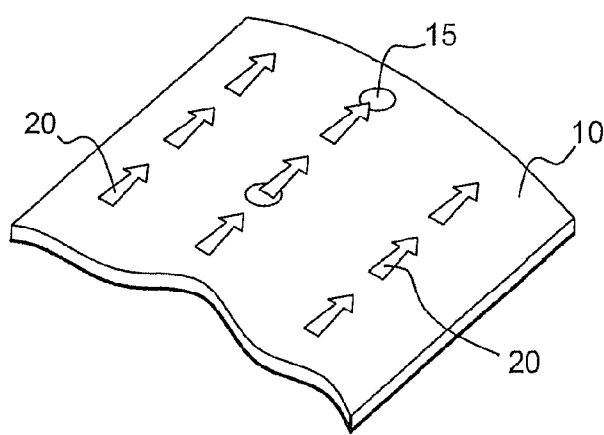
FIG. 3 is a partial perspective view showing the airflows at the surface of the panel of FIG. 2.

FIGS. 2 and 3 show a panel equipped with a lightning protection system according to a first embodiment of the disclosed embodiments. The panel comprises a sandwich structure with a center comprising two walls 10, 11 arranged respectively on opposite external surfaces of a honeycomb core 12.

These walls 10, 11 are frames made of composite. The composites can be chosen from amongst the group, given for non-limiting purposes, comprising glass composites, silica composites, quartz composites, basalt composites, aramid fibers or any other composite having suitable dielectric properties.

The honeycomb core 12 is, for example, made from aramid. The aramid fibers present, in effect, low flammability, high resistance to breakage and a high elasticity module.

This panel is an element constituting a radome and its upper wall 10, referred to as external wall, is intended to be exposed to an airflow.

The panel is equipped with a lightning protection system comprising an electrically conductive strip 13 having a longitudinal axis 14 and fasteners to fasten this strip 13 to the panel.

The cross-section of the electrically conductive strips 13 is conditional on two criteria, namely the choice of material used and the impact of the presence of these strips on radio performance. Purely for purposes of illustration, a minimum requirement of the state of the art permitting a good passage of the lightning current in the strip is 20 mm² for copper strips and 30 mm² for aluminum strips.

In a particular mode of implementation, a typical sizing of the copper strip will be a rectangular cross-section s of width I=8 mm and depth e=2.5 mm (s=I×e=20 mm²).

More generally, moving the electrically conductive strips to the inside of the electrically conductive strips allows an increase in their depths which can be, as a result, narrower.

Strips 13 therefore present a sufficient cross-section s for a good passage of the current while presenting a depth e and a width I that allows an improvement in the radome's radio transparency by reducing the cross-section of the strips seen from the radar antenna.

The fasteners each comprise an element 15 attaching lightning flashes to the panel inserted in a hole provided for this purpose in the depth of the panel.

The element 15 attaching lightning flashes to the panel is here a one-piece conducting stud comprising a threaded rod portion 17 in its lower part. This threaded rod portion 17 is intended to pass through a piercing in the electrically conductive strip 13 such that a nut 18 forming part of the fasteners and coming into contact on the surface opposite this strip ensures its fastening. As a consequence the attachment element 15 is in electrical contact with the electrically conductive strip 13.

This conducting stud 15 comprises an intermediary cylindrical portion linking the lower part 17 to its upper part 19. This upper part 19 presents an inverted truncated cone shape such that the base of this conical part forms the upper external surface of the conducting stud. The conducting stud 15 can be made in a metal material chosen from amongst the group comprising copper, stainless steel and aluminum.

The conducting stud 15 is placed in the hole of the panel such that its upper part 19 is flush with the external wall 10 of the panel, i.e. this upper external surface is at the same level as the external surface 10 of the panel. Thus, an airflow incident 20 on the panel only "sees" a substantially uniform surface and this flow can therefore remain laminar (FIG. 3).

In order to avert any constraint on the internal structure of the panel and to partially insulate the conducting stud 15 of the radar antenna that protects the radome, the conducting stud 15 is at least partially received in an insert 16 serving as an insulating element. This insert 16 can be made, for example, from insulating plastic such as an acetal resin. Delrin® marketed by Dupont de Nemours is especially suited to this disclosed embodiments.

This insert 16 comprises a main body and a head 21 intended to form an insulating mechanical interface between the lower wall 11 of the panel and the electrically conductive strip 13. The main body presents an internal hollow of a shape adapted to the profile of the conducting stud 15.

The electrically conductive strip 13 is therefore placed on the internal side of the panel such that this strip is placed on the inside of the radome and no longer perturbs the airflow on the external surface of the panel.

The conducting studs 15 fastening the electrically conductive strip 13 are preferably placed along its longitudinal axis 14. This latter is connected 22 to the airplane fuselage's ground, at the base of the radome.

The electrically conductive strip 13 is advantageously surrounded by an electrically insulating sheath 26 so as to avert any electrical arc attachments on the elements located under the radome (radar antenna or other). This electrically insulating sheath is, purely for purposes of illustration, a thermoplastic or teflon sheath.

Figure 4:
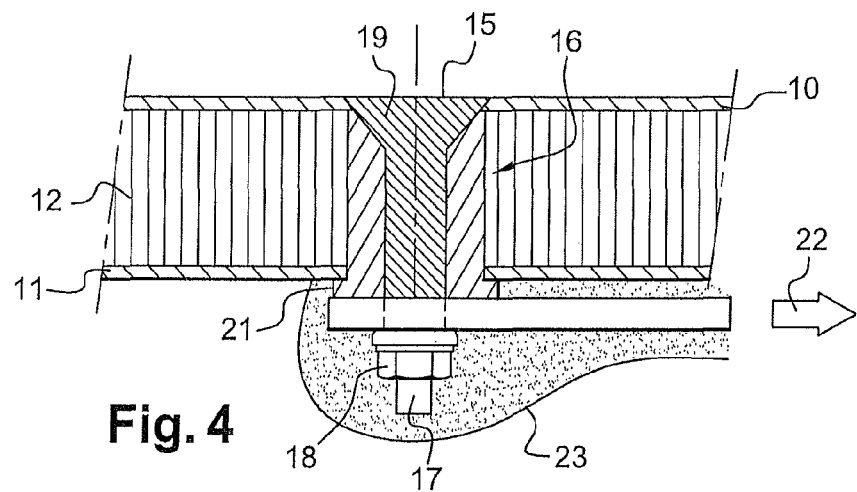
FIG. 4 is a schematic representation in cross-section of a panel equipped with a lightning protection system according to a second embodiment of the disclosed embodiments.

FIG. 4 is a cross-section view of a panel equipped with a lightning protection system according to a preferred embodiment of the disclosed embodiments. The elements bearing the same references as those in FIG. 2 represent the same objects. The panel in FIG. 4 differs from the one in FIG. 2 in that the threaded rod portion 17 of the metal studs 15, the heads 21 of the inserts, the nuts 18, the electrically conductive strips 13 and their insulating sheath are placed in a matrix 23 formed by a non-conducting paste such as a paste loaded with insulating particles. In this latter case, it can be a siliconized paste.

Figure 5:
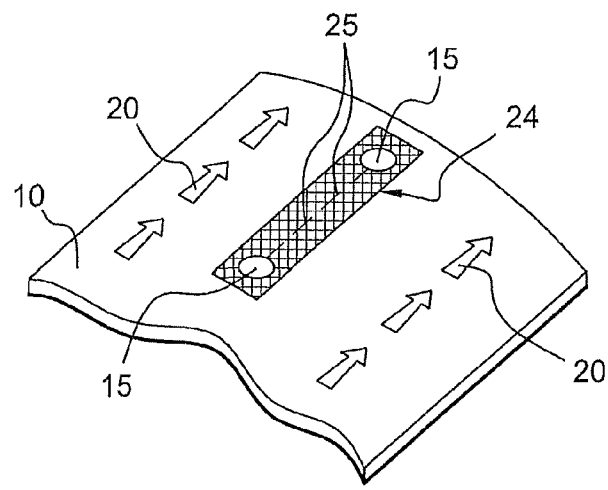
FIG. 5 is a schematic representation of a panel equipped with a lightning protection system according to a third embodiment of the disclosed embodiments.

FIG. 5 is a partial perspective view of a panel equipped with a lightning protection system according to a third embodiment of the disclosed embodiments. The elements bearing the same references as those in FIG. 2 represent the same objects. The panel in FIG. 5 differs from the one in FIG. 2 in that the wall 10 delimiting the external surface of the panel comprises a metal grid 24 in its depth. This grid 24 is in electrical contact with the elements 15 attaching lightning flashes to the panel.

Typically, the skin 10 comprising an assembly of layers, the metal grid 24 is placed under the first external layer of this skin extending longitudinally along the electrically conductive strip 13. This grid 24 can be made of bronze.

In addition the lightning protection system can comprise one or more strips of pellets 25 each comprising a juxtaposition of electrically conductive pellets such as metal pellets, of small dimensions, typically 5 mm in diameter, substantially aligned and separated by a small clearance, currently 1 to 3 mm.

Each strip of pellets placed between two elements 15 attaching lightning flashes to the panel allows the lightning arc to be guided via ionization of the air between each pellet.

The invention claimed is:

1. Lightning protection system for a composite structure having an external surface to be subjected to an airflow, said system comprising:
   at least one electrically conductive strip configured to be placed on a side of the composite structure opposite said external surface and to be connected to ground; and
   fasteners for fastening the at least one electrically conductive strip to said structure, wherein
      said fasteners are configured to be received in holes of the composite structure, and
      one or more of said fasteners comprise an element for attaching lightning flashes to the composite structure, and wherein
      said element for attaching lightning flashes is configured to be inserted in one of said holes with an upper part substantially at a level of the external surface of said composite structure, and
      said element for attaching lightning flashes is in electrical contact with said electrically conductive strip.

2. System according to claim 1, comprising an electrically insulating sheath configured to cover said electrically conductive strip.

3. System according to claim 2, comprising a non-conductive paste configured to form a matrix enveloping at least said electrically conductive strip and its the insulating sheath.

4. System according to claim 1, comprising electrically conductive pellets configured to be placed in recesses on the external surface of said structure, said recesses being substantially aligned between two consecutive fasteners to facilitate sweeping of a lightning arc between at least two elements for attaching lightning flashes to said composite structure.

5. System according to claim 1, comprising a metal grid configured to be integrated in a depth of a wall delimiting the external surface of said composite structure, said grid configured to be in electrical contact with said element for attaching lightning flashes.

6. System according to claim 1, wherein element for attaching lightning flashes to the composite structure comprises a one-piece conducting stud comprising a lower part with a threaded rod portion, said threaded rod portion being configured to pass through a piercing in said electrically conductive strip.

7. Composite structure having an external surface configured to be subjected to an airflow, wherein said composite structure is equipped with a lightning protection system according claim 1 and in that the external surface of said composite structure is non-metallic.

8. Structure according to claim 7, wherein said element for attaching lightning flashes comprise a plurality of elements arranged in the form of a strip.

9. Structure according to claim 7, wherein said element for attaching lightning flashes comprises a plurality of substantially aligned and regularly spaced elements.

10. Structure according to claim 7, wherein said structure is monolithic or comprises at least two walls arranged respectively on opposite surfaces of a core.

11. Structure according to claim 7, wherein said composite structure is made of insulating material and only said element for attaching lightning flashes, and said electrically conductive strip are conducting elements.

12. Panel comprising at least one composite structure according to claim 7.

13. Radome equipped with at least one panel according to claim 12.

14. Aircraft equipped with at least one panel according to claim 12.

* * * * *